(12) United States Patent
Pathak

(10) Patent No.: US 11,921,862 B2
(45) Date of Patent: Mar. 5, 2024

(54) SYSTEMS AND METHODS FOR RULES-BASED AUTOMATED PENETRATION TESTING TO CERTIFY RELEASE CANDIDATES

(71) Applicant: JPMORGAN CHASE BANK, N.A., New York, NY (US)

(72) Inventor: Ambika Prasad Pathak, Mumbai (IN)

(73) Assignee: JPMORGAN CHASE BANK, N.A., New York, NY (US)

( * ) Notice: Subject to any disclaimer, the term of this patent is extended or adjusted under 35 U.S.C. 154(b) by 462 days.

(21) Appl. No.: 17/169,047

(22) Filed: Feb. 5, 2021

(65) Prior Publication Data

US 2021/0248242 A1   Aug. 12, 2021

(30) Foreign Application Priority Data

Feb. 7, 2020   (IN) .............................. 202011005414

(51) Int. Cl.
*G06F 21/57* (2013.01)
*G06F 11/36* (2006.01)
*G06N 20/00* (2019.01)

(52) U.S. Cl.
CPC ........ *G06F 21/577* (2013.01); *G06F 11/3664* (2013.01); *G06F 11/3684* (2013.01);
(Continued)

(58) Field of Classification Search
CPC ............. G06F 11/3664; G06F 11/3668; G06F 11/3684; G06F 11/3688; G06F 11/3692;
(Continued)

(56) References Cited

U.S. PATENT DOCUMENTS 8,856,869 B1 * 10/2014 Brinskelle ........... H04L 63/0823
726/2
2006/0265190 A1 * 11/2006 Hein ................... G06F 11/3438
702/186

(Continued)

FOREIGN PATENT DOCUMENTS

WO   WO-2012170423 A1 * 12/2012 ........... G06F 21/552

OTHER PUBLICATIONS

Sheykhkanloo, Naghmeh Moradpoor, Employing Neural Networks for the Detection of SQL Injection Attack, Proceedings of the 7th International Conference on Security of Information and Networks, Sep. 2014, 6 pages, [retrieved on Jun. 2, 2023], Retrieved from the Internet: <URL:http://dl.acm.org/>.*

(Continued)

*Primary Examiner* — Geoffrey R St Leger
(74) *Attorney, Agent, or Firm* — GREENBERG TRAURIG LLP

(57) ABSTRACT

Systems and methods for rules-based automated penetration testing and regression to certify release candidates against known patterns that inject vulnerabilities are disclosed. In one embodiment, a method for rules-based automated penetration testing to certify release candidates may include: (1) receiving, at a penetration test computer program executed by a computer processor, a plurality of URLs for an application to be tested; (2) retrieving, by the penetration test computer program and from a rules pack in a database, an URL injectible and a URL parameter for the URL injectible; (3) generating, by a URL scanner and malformer computer program, a malformed URL, wherein the malformed URL may include one of the URLs injected with the URL injectible injected at the parameter in the URL; (4) firing, by the penetration test computer program, the malformed URL; (5) receiving, by the penetration test computer program, an output from the application; and (6) executing at least one validation algorithm on the output.

18 Claims, 2 Drawing Sheets

(52) U.S. Cl.
CPC .... *G06F 11/3692* (2013.01); *G06F 2221/033* (2013.01); *G06N 20/00* (2019.01)

(58) Field of Classification Search
CPC .. G06F 2221/033; G06F 21/577; G06N 20/00
USPC ................................................ 717/124, 125
See application file for complete search history.

(56) References Cited

U.S. PATENT DOCUMENTS

| | | | |
|---|---|---|---|
| 2008/0109680 A1* | 5/2008 | Kodaka ............... | G06F 11/3688 714/38.1 |
| 2009/0119777 A1* | 5/2009 | Jeon ...................... | G06F 21/577 726/25 |
| 2011/0238733 A1* | 9/2011 | Yoo ....................... | G06F 11/008 709/224 |

OTHER PUBLICATIONS

Liu, Miao, et al., A Web Second-Order Vulnerabilities Detection Method, IEEE Access, 2018, 6 pages, [retrieved on Oct. 16, 2023], Retrieved from the Internet: <URL:http://ieeexplore.ieee.org/>.*

Alam, Delwar, et al., A Case Study of SQL Injection Vulnerabilities Assessment of .bd Domain Web Applications, Fourth International Conference on Cyber Security, Cyber Warfare, and Digital Forensic, 2015, 5 pages, [retrieved on Oct. 16, 2023], Retrieved from the Internet: <URL:http://ieeexplore.ieee.org/>.*

\* cited by examiner

SYSTEMS AND METHODS FOR RULES-BASED AUTOMATED PENETRATION TESTING TO CERTIFY RELEASE CANDIDATES

RELATED APPLICATIONS

This application claims priority to, and the benefit of, Indian Patent Application No. 202011005414 filed Feb. 7, 2020, the disclosure of which is hereby incorporated, by reference, in its entirety.

BACKGROUND OF THE INVENTION

1. Field of the Invention

Embodiments generally relate to systems and methods for rules-based automated penetration testing and regression to certify release candidates against known patterns that inject vulnerabilities.

2. Description of the Related Art

Penetration tests may be used to test external-facing applications. This testing and regression is a manual process with a long turn-around time. Because of this, penetrating testing is largely a reactive process, and not all applications, such as internal-facing applications, are tested due to resource constraints. In addition, because it is a manual process, there is poor quality of regression.

SUMMARY OF THE INVENTION

Systems and methods for rules-based automated penetration testing and regression to certify release candidates against known patterns that inject vulnerabilities are disclosed. In one embodiment, a method for rules-based automated penetration testing to certify release candidates may include: (1) receiving, at a penetration test computer program executed by a computer processor, a plurality of URLs for an application to be tested; (2) retrieving, by the penetration test computer program and from a rules pack in a database, an URL injectible and a URL parameter for the URL injectible; (3) generating, by a URL scanner and malformer computer program, a malformed URL, wherein the malformed URL may include one of the URLs injected with the URL injectible injected at the parameter in the URL; (4) firing, by the penetration test computer program, the malformed URL; (5) receiving, by the penetration test computer program, an output from the application; and (6) executing at least one validation algorithm on the output.

In one embodiment, the method may further include: retrieving, by the penetration test computer program, login information for the application; and logging in to the application using the login information.

In one embodiment, the method may further include: executing, by the penetration test computer program, a health check on the application; and verifying, by the penetration test computer program, that the application passes the health check before receiving the plurality of URLs.

In one embodiment, the parameter may be identified in the rule packs.

In one embodiment, the URL scanner and malformer computer program may inject a plurality of injectibles, each at a different parameter in the URL. The parameter for injection may be configured in rules or it may be the first parameter.

In one embodiment, the validation algorithm may validate that the output does not include an alert or that the output does not include sensitive data.

In one embodiment, the URL scanner and malformer computer program may scan the URL for parameters to inject the URL injectible.

In one embodiment, the method may further include identifying by the penetration test computer program, the application as passing or failing the penetration test based on the execution of the at least one validation algorithm.

In one embodiment, the URL injectibles may be based on a URL injection pattern as defined by the Open Web Application Security Project ("OWASP"), on machine learning, etc.

According to another embodiment, a system for rules-based automated penetration testing to certify release candidates may include: a server comprising at least one computer processor executing a penetration test computer program and a URL scanner and malformer computer program; a URL store that stores URLs for an application to be tested; and a rule pack database comprising a URL injectible and a parameter for injecting the URL injectible. The penetration test computer program may receive, from the URL store, a plurality of URLs for the application to be tested and may retrieve from the rules pack in the database, the URL injectible and the URL parameter for the URL injectible. The URL scanner and malformer computer program may generate a malformed URL by injecting the URL injectible into one of the URLs from the URL store at the parameter in the URL. The penetration test computer program may fire the malformed URL, may receive an output from the application, and may execute at least one validation algorithm on the output.

In one embodiment, the penetration test computer program may also retrieve login information for the application and may log in to the application using the login information.

In one embodiment, the penetration test computer program may execute a health check on the application and may verify that the application passes the health check before receiving the plurality of URLs.

In one embodiment, the parameter may be identified in the rule packs.

In one embodiment, the URL scanner and malformer computer program may inject a plurality of injectibles, each at a different parameter in the URL. The parameter for injection may be configured in rules or it may be the first parameter.

In one embodiment, the validation algorithm may validate that the output does not include an alert or that the output does not include sensitive data.

In one embodiment, the URL scanner and malformer computer program may scan the URL for parameters to inject the URL injectible.

In one embodiment, the penetration test computer program may identify the application as passing or failing the penetration test based on the execution of the at least one validation algorithm.

In one embodiment, the URL injectibles may be based on a URL injection pattern as defined by the Open Web Application Security Project ("OWASP"), machine learning, etc.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Embodiments are directed to systems and methods for rules-based automated penetration testing to certify release candidates in a continuous integration/continuous delivery pipeline.

Embodiments may provide rules-based automated penetration testing on release candidates using a technical stack of, for example, core Java and Selenium. The service may be integrated into a continuous integration/continuous delivery pipeline, and reports output as a result of the testing, such as Cucumber Reports, may act as a tollgate for the release candidate.

Figure 1:
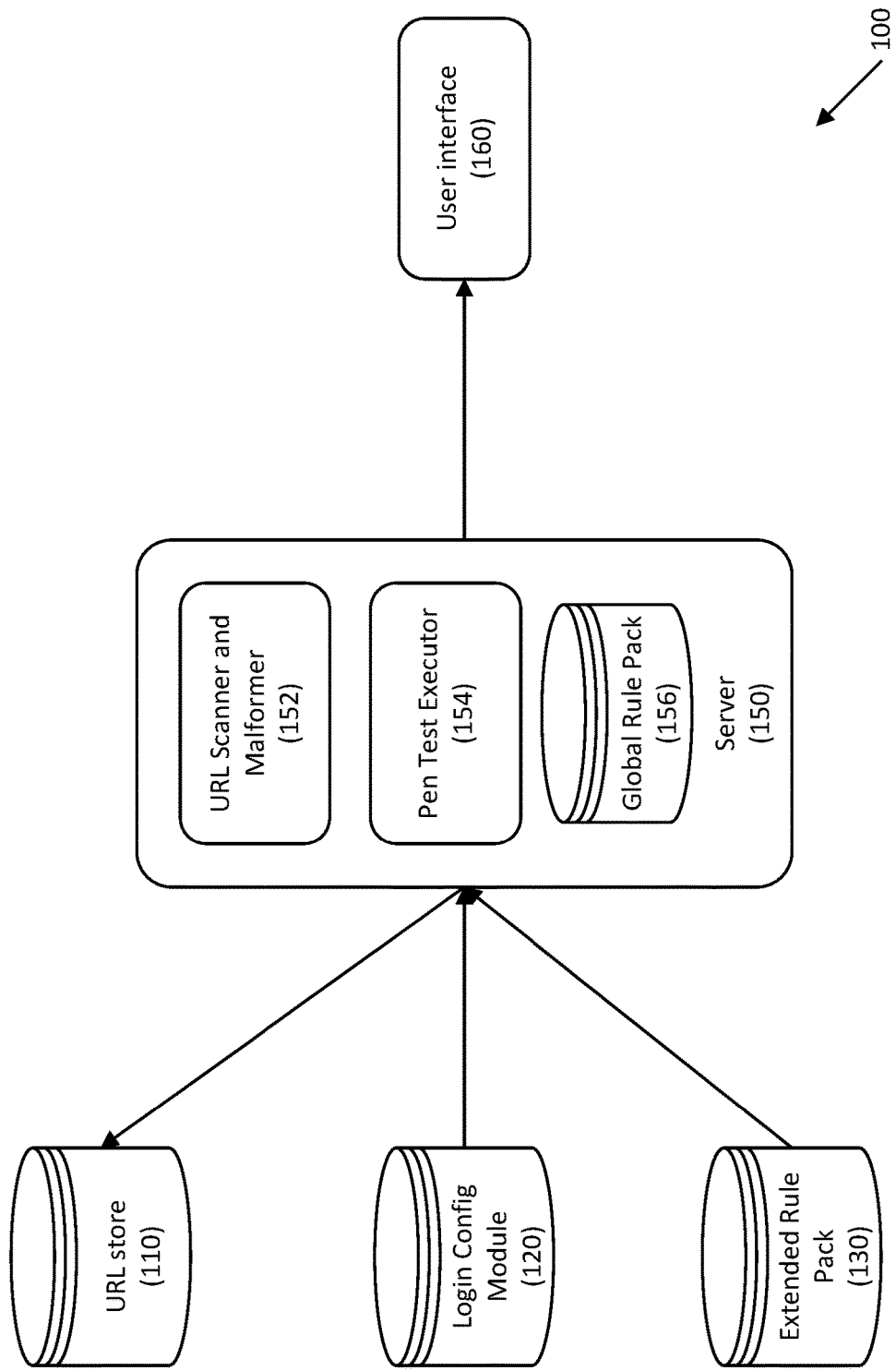
FIG. 1 depicts a system for rules-based automated penetration testing and regression according to one embodiment.

Referring to FIG. 1, a system for rules-based automated penetration testing to certify release candidates is disclosed according to one embodiment. In one embodiment, system 100 may include URL store 110 that may store a plurality of URLs associated with one or more applications, login configuration module 120 that stores login information, such as login URLs and encrypted credentials for a plurality of users; and extended rule pack 130. Server 150 may include URL scanner and malformer 152, penetration test executor 154, and global rule pack 156. User interface 160 may provide reporting.

URL store 110 may be a database and/or file system-based store that may include application URLs that may be captured manually or through a proxy tool in production parallel environment.

Extended rule pack 130 and/or global rule pack 156 may include configured rules for penetration test execution. global rule pack 156 may include configured rules that may be generic, whereas extended rule pack 130 may include configured rules that may be specific to an organization, an application, etc. In one embodiment, extended rule pack 130 and global rule pack 156 may be combined into a single rule pack.

In one embodiment, extended rule pack 130 and/or global rule pack 156 may be stored in one or more database or similar storage.

In general, the configured rules may provide the basis for injecting URL injectibles into URLs, as well as the parameters where the URL injectibles need to be injected. For example, global rule pack 156 and/or extended rule pack 130 may include one or more URL injection pattern as defined by the Open Web Application Security Project ("OWASP") across several categories. The rules may be configured from OWASP-suggested examples, from any manual hacking activities, etc., and may be in JSON format. The rules may also be enhanced with machine learning.

Example categories include information gathering, configuration and deployment management testing, identity management testing, authentication testing, authorization testing, session management testing, input validation testing, error handling, and business logic testing.

Examples rules are as follows:
"Input Validation": [{
"validationCategory": "Reflected Cross site scripting",
"injectibles": ["<script>alert('xss')</script>",
"%3cscript%3ealert(%27hi%27)%3c/script%3e",
"%3Csvg%20onload=alert(%27xss%27)%3E"],
"validationAlgorithm": "VERIFY_NO_ALERT",
"userParameters": "param1",
"response": "200"
}],
"Error Validation": [{
"validationCategory": "Error, Exception handling & Logging",
"injectibles": ["87\\$4166"],
"validationAlgorithm": "NO_SENSITIVE_DATA"
"userParameters": "param2",
"response": "500"
}]

The rules may further provide the bases for evaluating responses with the validation algorithms. Example algorithms may include:

VERIFY_NO_ALERT—the algorithm may see if any alert was raised for alert injection cases;

NO_SENSITIVE_DATA—the algorithm may review the response against a database of known sensitive keywords, such keywords associated with Personally Identifiable Information (PII), Material Nonpublic Information (MNPI), Highly Confidential data, etc. and any sensitive data if any errors or exceptions that are rendered in page contain sensitive data; and DEFAULT_MATCH_CASE—the algorithm may evaluate the response code(s) received in response to the malformed URL to the response codes identified in the global or extended rule pack. If the received response code matches a response code indicating an error, then the response code may indicate failure of the penetration test.

For example, if the application URL (malformed with URL injectible) results in response code of 200 after it is fired (i.e., executed as if it were clicked), then it indicates "Reflected Cross Site Scripting" failure.

"Input Validation": [{
"validationCategory": "Reflected Cross site scripting",
"injectibles": ["<script>alert('xss')</script>"],
"validationAlgorithm": "DEFAULT_MATCH_CASE",
"userParameters": "param1",
"response": "200"
}]

URL scanner and malformer 152 may include one or more component that reads URLs from URL store 110. It may then scan the URLs for parameters to inject URL injectibles, and may create multiple cases by malforming the URLs by injecting patterns from global rule pack 156 and/or extended rule pack 130. URL scanner and malformer 152 may be controlled by penetration test executor 154.

Penetration test executor 154 may be a computer program executed by a computer processor that fires the malformed URL (i.e. executes the malformed URL as if it were clicked) for one or more validation category, such as information gathering, configuration and deployment management testing, identity management testing, authentication testing, authorization testing, session management testing, input validation testing, error handling, cryptography, business logic testing, etc. Note that these validation categories are exemplary only, and additional, fewer, or different validation categories may be used as is necessary and/or desired.

In one embodiment, penetration test executor 154 may access the malformed URLs and may call validation algorithms as configured. As discussed above, the validation algorithms may, for example, validate that no alert was raised for alert injection cases, validate that no sensitive data (e.g., PII, highly confidential information, etc.) was returned as a result of the malformed URL, and validate that the response code does not match a response code specified in the rules as being a failure.

In one embodiment, Selenium may be used as a framework to test the applications and may invoke the malformed URLs.

In one embodiment, penetration test executor 154 may and reflect the result of the testing in reports (e.g., Cucumber reports) that may be output in user interface 160. In one embodiment, penetration test executor 154 may be executed on a computer device, such as a server, including local and cloud-based servers.

In one embodiment, the testing service may be available as a service in continuous integration/continuous delivery setup. The testing may be automatically triggered after deployment and start of the built application package. For example, a CI/CD pipeline may include an initialization stage, a build stage, a scan stage (e.g., a sonar scan, a static scan, a Black Duck scan, etc.), and a deployment stage. The penetration test may be triggered as part of or following the deployment stage.

In embodiment, the testing service may act as a tollgate in an automated build pipeline, such as that provided by the continuous integration/continuous delivery pipeline. This process may therefore be completely automatic.

Embodiments may reduce testing time significantly. For example, a testing cycle may be reduced from 20-25 days to hours or minutes. Because it is an automated process, there are no dependencies on external teams, bureaucratic processes, etc.

The quality and coverage of all attacks across all links is improved, and the report may act as a tollgate in the continuous integration/continuous delivery pipeline.

In addition, because it is an automated process, web applications that are both external facing and internal facing, including new releases, may be certified once they are available in the continuous integration/continuous delivery pipeline.

Figure 2:
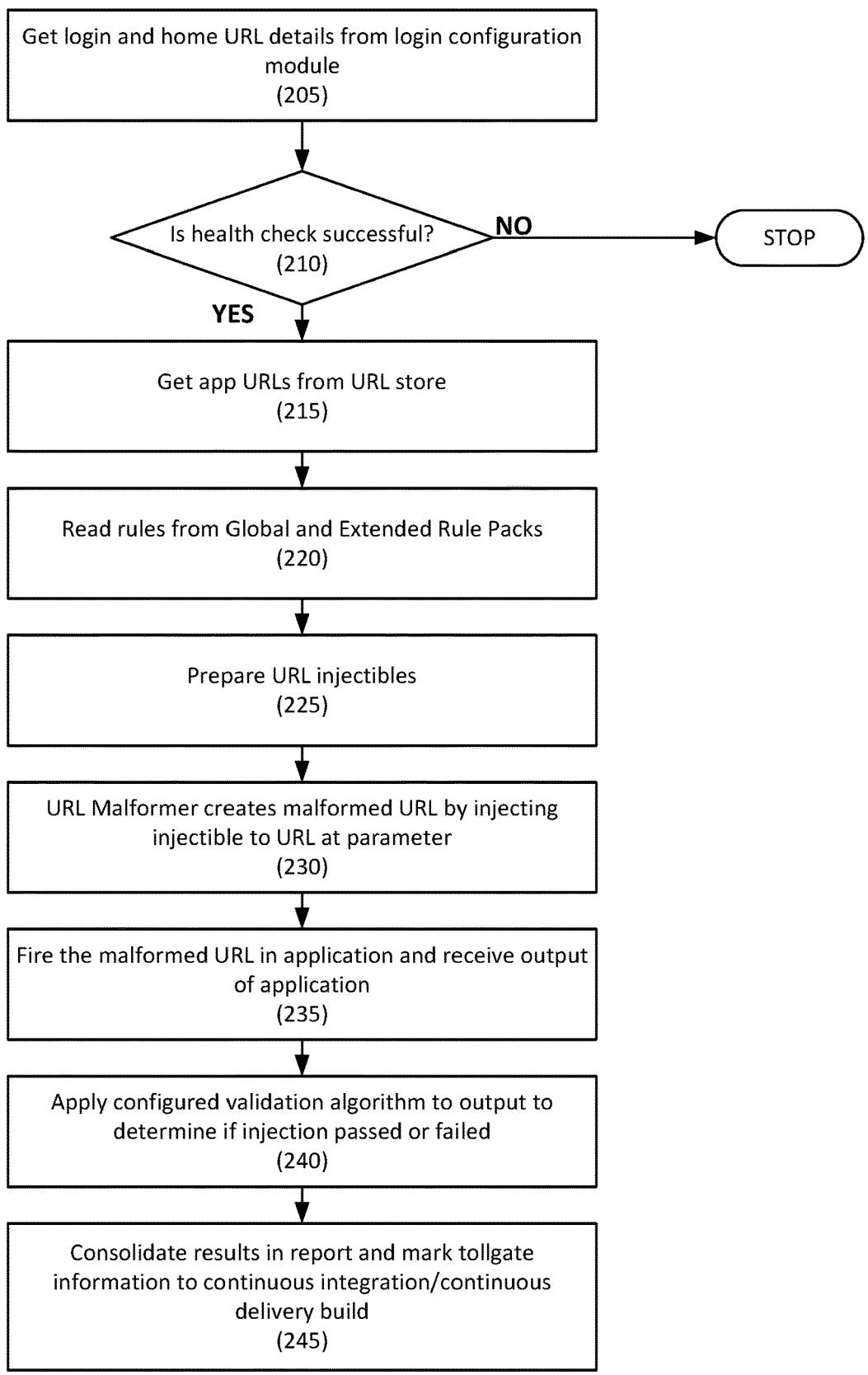
FIG. 2 depicts a method for rules-based automated penetration testing and regression according to one embodiment.

Referring to FIG. 2, a method for rules-based automated penetration testing to certify release candidates is disclosed according to one embodiment. In one embodiment, the method may be trigged by the application being at a certain point of a continuous integration/continuous delivery pipeline. In another embodiment, the method may be automatically triggered when an application is updated, periodically, or when otherwise necessary and/or desired.

In step 205, a penetration test executor may receive login and home URL details for an application to be tested from a login configuration module. In one embodiment, the login information may be used by the penetration test executor to automatically log in to the application to begin the penetration test.

In step 210, an optional health check may be run. The health check may make sure that the application is up and running before the penetration test is run. If the health check is successful, the process may continue. If the health check is unsuccessful, the process may end.

In step 215, the penetration test executor may retrieve URLs for the application to be tested from a URL store. Each URL may be for a different business functionality link.

In step 220, the penetration test executor may read retrieve from the global and/or extended rule packs. In one embodiment, the rules may be based on OWASP-suggested examples, from any manual hacking activities.

In steps 225, based on the rules from the global and extended rule packs, the penetration test executor may retrieve the URLs from, for example, the URL store and may retrieve the URL injectibles from the global rule pack and/or extended rule pack.

In step 230, the penetration test executor may call the URL malformer component to create a set of malformed URLs from the URLs and the URL injectibles. For example, the malformed URLs may be formed by injecting the URL injectibles into the URL at the appropriate parameter.

In one embodiment, the parameter at which to inject the URL injectible may be identified in the rules. In another embodiment, the parameter may be identified using machine learning. In still another embodiment, the parameter may be identified by the order in which it appears in the URL.

In step 235, the penetration test executor may "fire" the malformed URLs (i.e., execute the malformed URLs as if they were clicked) and may receive the output of the application.

In step 240, the penetration test executor may apply one or more configured validation algorithm to the output to determine if the application passed or failed the penetration test. For example, the algorithms may validate that no alert was raised for alert injection cases, validate that no sensitive data (e.g., PII, highly confidential information, etc.) was returned as a result of the malformed URL, and validate that the response code does not match a response code specified in the rules as being a failure.

In step 245, the penetration test executor may consolidate the results of the penetration test executions, per error category, and mark tollgate information to the continuous integration/continuous delivery build.

Based on the results, the "Release Candidate" build may be marked ready for production deployment with "Pen Test Passed," or may be marked in "Pen Test Failed" state indicating that the application is not approved for production deployment. Any suitable indication may be used as is necessary and/or desired, and the indication may be stored in the continuous integration/continuous deployment build results. In one embodiment, if the application is marked with "Pen Test Failed," or similar, systems may prevent the application from being promoted to production. How applications that fail the penetration test are handled may be configured in the continuous integration/continuous deployment process.

Hereinafter, general aspects of implementation of the systems and methods of embodiments will be described.

Embodiments of the system or portions of the system may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement embodiments may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes disclosed herein.

The processing machine used to implement embodiments may utilize a suitable operating system. Thus, embodiments may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the embodiments as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above, in accordance with a further embodiment, may be performed by a single component. Further, the processing performed by one distinct component as described above may be performed by two distinct components.

In a similar manner, the memory storage performed by two distinct memory portions as described above, in accordance with a further embodiment, may be performed by a single memory portion. Further, the memory storage performed by one distinct memory portion as described above may be performed by two memory portions.

Further, various technologies may be used to provide communication between the various processors and/or memories, as well as to allow the processors and/or the memories to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of embodiments may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method. Rather, any number of different programming languages may be utilized as is necessary and/or desired.

Also, the instructions and/or data used in the practice of embodiments may utilize any compression or encryption technique or algorithm, as may be desired. An encryption module might be used to encrypt data. Further, files or other data may be decrypted using a suitable decryption module, for example.

As described above, the embodiments may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in embodiments may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors.

Further, the memory or memories used in the processing machine that implements embodiments may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the systems and methods, a variety of "user interfaces" may be utilized to allow a user to interface with the processing machine or machines that are used to implement embodiments. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method, it is not necessary that a human user actually interact with a user interface used by the processing machine. Rather, it is also contemplated that the user interface might interact, i.e., convey and receive information, with another processing machine, rather than a human user. Accordingly, the other processing machine might be characterized as a user. Further, it is contemplated that a user interface utilized in the system and method may interact partially with another processing machine or processing machines, while also interacting partially with a human user.

It will be readily understood by those persons skilled in the art that embodiments are susceptible to broad utility and application. Many embodiments and adaptations of the present invention other than those herein described, as well as many variations, modifications and equivalent arrangements, will be apparent from or reasonably suggested by the foregoing description thereof, without departing from the substance or scope.

Accordingly, while embodiments present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for rules-based automated penetration testing to certify release candidates, comprising:
   receiving, at a penetration test computer program executed by a computer processor, a plurality of uniform resource locators (URLs) for an application to be tested;
   retrieving, by the penetration test computer program and from a rules pack in a database, a penetration test rule, wherein the penetration test rule includes a URL injectible value, a validation algorithm indication, a URL parameter, and a response code;
   generating, by a URL scanner and malformer computer program, a malformed URL, wherein generating the malformed URL includes:
     determining that a first URL of the plurality of URLs includes the URL parameter; and
     injecting the URL injectible value as a value of the URL parameter included in the first URL of the plurality of URLs;
   firing, by the penetration test computer program, the malformed URL;
   receiving, by the penetration test computer program, an output from the application; and
   executing a validation algorithm that is indicated by the validation algorithm indication on the output from the application.

2. The method of claim 1, further comprising:
   retrieving, by the penetration test computer program, login information for the application; and
   logging in to the application using the login information.

3. The method of claim 1, further comprising:
   executing, by the penetration test computer program, a health check on the application; and
   verifying, by the penetration test computer program, that the application passes the health check before receiving the plurality of URLs.

4. The method of claim 1, wherein the URL scanner and malformer computer program injects a plurality of injectibles into the first URL, each at a different parameter in the first URL.

5. The method of claim 1, wherein the validation algorithm validates that the output from the application does not include an alert or that the output from the application does not include sensitive data.

6. The method of claim 1, wherein the URL scanner and malformer computer program scans the first URL of the plurality of URLs for parameters.

7. The method of claim 1, further comprising:
   identifying, by the penetration test computer program, the application as passing or failing the penetration test rule based on the execution of the validation algorithm.

8. The method of claim 1, wherein the URL injectible value is based on a URL injection pattern as defined by the Open Web Application Security Project ("OWASP").

9. The method of claim 1, wherein the URL injectible value is injectibles are based on machine learning.

10. A system for rules-based automated penetration testing to certify release candidates, comprising:
   a server comprising at least one computer processor executing a penetration test computer program and a uniform resource locator (URL) scanner and malformer computer program;
   a URL store that stores URLs for an application to be tested; and a rule pack stored in a database wherein the rule pack comprises a penetration test rule, wherein the penetration test rule includes a URL injectible value, a validation algorithm indication, a URL parameter, and a response code;

wherein:

the penetration test computer program receives, from the URL store, a plurality of URLs for the application to be tested;

the penetration test computer program retrieves, from the rule pack in the database, the penetration test rule;

the URL scanner and malformer computer program generates a malformed URL, wherein the URL scanner and malformer computer program:

determines that a first URL of the plurality of URLs includes the URL parameter; and injects the URL injectible value as a value of the URL parameter included in the first URL of the plurality of URLs;

the penetration test computer program fires the malformed URL;

the penetration test computer program receives an output from the application; and the penetration test computer program executes a validation algorithm that is indicated by the validation algorithm indication on the output from the application.

11. The system of claim 10, wherein the penetration test computer program retrieves login information for the application and logs in to the application using the login information.

12. The system of claim 10, wherein the penetration test computer program executes a health check on the application and verifies that the application passes the health check before receiving the plurality of URLs.

13. The system of claim 10, wherein the URL scanner and malformer computer program injects a plurality of injectibles into the first URL, each at a different parameter in the first URL.

14. The system of claim 10, wherein the validation algorithm validates that the output from the application does not include an alert or that the output from the application does not include sensitive data.

15. The system of claim 10, wherein the URL scanner and malformer computer program scans the first URL of the plurality of URLs for parameters.

16. The system of claim 10, wherein the penetration test computer program identifies the application as passing or failing the penetration test rule based on the execution of the validation algorithm.

17. The system of claim 10, wherein the URL injectible value is based on a URL injection pattern as defined by the Open Web Application Security Project ("OWASP").

18. The system of claim 10, wherein the URL injectible value is based on machine learning.

* * * * *